United States Patent
Talagala et al.

(10) Patent No.: US 7,051,155 B2
(45) Date of Patent: May 23, 2006

(54) METHOD AND SYSTEM FOR STRIPING DATA TO ACCOMMODATE INTEGRITY METADATA

(75) Inventors: Nisha Talagala, Fremont, CA (US); Brian Wong, Gordonsville, VA (US)

(73) Assignee: Sun Microsystems, Inc., Santa Clara, CA (US)

( * ) Notice: Subject to any disclaimer, the term of this patent is extended or adjusted under 35 U.S.C. 154(b) by 240 days.

(21) Appl. No.: 10/212,861

(22) Filed: Aug. 5, 2002

(65) Prior Publication Data

US 2004/0024963 A1 Feb. 5, 2004

(51) Int. Cl.
*G06F 12/00* (2006.01)

(52) U.S. Cl. .......................................... 711/114; 714/6
(58) Field of Classification Search ................ 711/114; 714/1–7, 52, 770
See application file for complete search history.

(56) References Cited

U.S. PATENT DOCUMENTS

| | | | |
|---|---|---|---|
| 5,197,148 A | 3/1993 | Blount et al. | |
| 5,201,044 A | 4/1993 | Frey et al. | |
| 5,206,939 A | 4/1993 | Moshe et al. | |
| 5,720,026 A | 2/1998 | Uemura et al. | |
| 5,796,934 A | 8/1998 | Bhanot et al. | |
| 5,889,934 A | 3/1999 | Peterson | |
| 5,995,308 A | 11/1999 | Assouad et al. | |
| 6,009,542 A | 12/1999 | Koller et al. | |
| 6,343,343 B1 | 1/2002 | Menon et al. | |
| 6,347,359 B1 | 2/2002 | Smith et al. | |
| 6,397,309 B1 | 5/2002 | Nadav et al. | |
| 6,408,416 B1 | 6/2002 | Morley et al. | |
| 6,418,519 B1 | 7/2002 | Cadden et al. | |
| 6,467,060 B1 | 10/2002 | Malakapalli et al. | |
| 6,484,185 B1 | 11/2002 | Jain et al. | |
| 6,553,511 B1 | 4/2003 | DeKoning et al. | |
| 6,584,544 B1 | 6/2003 | Morley et al. | |
| 6,587,962 B1 | 7/2003 | Hepner et al. | |
| 6,606,629 B1 | 8/2003 | DeKoning et al. | |
| 6,629,273 B1 | 9/2003 | Patterson | |
| 6,684,289 B1 | 1/2004 | Gonzalez et al. | |
| 6,687,791 B1 | 2/2004 | Morrison | |
| 6,728,922 B1 | 4/2004 | Sundaram et al. | |
| 6,874,001 B1 | 3/2005 | Narang et al. | |
| 6,880,060 B1 | 4/2005 | Talagala et al. | |
| 2003/0070042 A1* | 4/2003 | Byrd et al. | ............. 711/114 |
| 2003/0140299 A1 | 7/2003 | Duncan et al. | |
| 2003/0145270 A1 | 7/2003 | Holt | |
| 2003/0163777 A1 | 8/2003 | Holt | |

(Continued)

OTHER PUBLICATIONS

White Paper, "The EMC CLARiion Data Integrity Difference," pp. 1-11 (May 2001).

*Primary Examiner*—Nasser Moazzami
(74) *Attorney, Agent, or Firm*—Blakely, Sokoloff, Taylor & Zafman LLP

(57) ABSTRACT

A data layout mechanism is described for allocating metadata within a storage system employing data striping. The data layout mechanism includes a number of storage devices, each of the storage devices having storage spaces allocated to store individual data stripe units associated with a number of stripes. The data layout mechanism further includes a plurality of metadata chunks allocated within the storage devices such that (1) metadata associated with at least two data stripe units of the same stripe is stored within a single metadata chunk, and (2) the metadata chunks are evenly distributed across the storage devices.

31 Claims, 9 Drawing Sheets

U.S. PATENT DOCUMENTS

| | | |
|---|---|---|
| 2003/0188216 A1 | 10/2003 | Elko et al. |
| 2003/0221155 A1 | 11/2003 | Weibel et al. |
| 2004/0034817 A1 | 2/2004 | Talagala et al. |
| 2004/0123032 A1 | 6/2004 | Talagala et al. |
| 2004/0123202 A1 | 6/2004 | Talagala et al. |
| 2004/0153746 A1 | 8/2004 | Talagala et al. |

* cited by examiner

METHOD AND SYSTEM FOR STRIPING DATA TO ACCOMMODATE INTEGRITY METADATA

BACKGROUND

1. Field

Embodiments of the invention relate to data layout architecture, and more specifically, to data layout architecture for storing and accessing integrity metadata.

2. Background

Data storage systems may include an array of disk drives and one or more dedicated computers and software systems to manage data. A primary concern of such data storage systems is that of data corruption and recovery. Silent data corruption occurs where the data storage system returns erroneous data and does not realize that the data is wrong. Silent data corruption may result from a glitch in the data retrieval software causing the system software to read from, or write to, the wrong address, etc. Silent data corruption may also result from hardware failures such as a malfunctioning data bus or corruption of the magnetic storage media that may cause a data bit to be inverted or lost. Silent data corruption may also result from a variety other causes.

Silent data corruption is particularly problematic. For example, when an application requests data and gets the wrong data this may cause the application to crash. Additionally, the application may pass along the corrupted data to other applications. If left undetected, these errors may have disastrous consequences (e.g., irreparable undetected long-term data corruption).

The problem of detecting silent data corruption may be addressed by creating integrity metadata (data pertaining to data) for each data stripe unit. Integrity metadata may include address data to verify the location of the data stripe unit, or a checksum to verify the contents of a data stripe unit. A checksum is a numerical value derived through a mathematical computation on the data in a data stripe unit. Basically when data is stored, a numerical value is computed and associated with the stored data. When the data is subsequently read, the same computation is applied to the data. If an identical checksum results then the data is assumed to be uncorrupted.

Typically, data storage systems use an array of disk drives configured under one of redundant arrays of inexpensive disks (RAID) configurations. For example, one RAID architecture using data striping is RAID 0, in which data stripe units are striped across multiple disk drives to enable multiple read and write operations to be executed concurrently. Other types of RAID configurations have been defined and use data striping to improve performance.

SUMMARY

According to one aspect of the invention, a data layout mechanism is provided for allocating metadata within a storage system employing data striping. The data layout mechanism comprises a plurality of storage devices, each of the storage devices having storage spaces allocated to store individual data stripe units associated with a plurality of stripes. The data layout mechanism further comprises a plurality of metadata chunks allocated within the storage devices such that (1) metadata associated with at least two data stripe units of the same stripe is stored within a single metadata chunk, and (2) the metadata chunks are evenly distributed across the storage devices.

In accordance with one embodiment, each individual metadata chunk is allocated adjacent to one of the data stripe units associated with the corresponding stripe.

In accordance with another embodiment, each individual metadata chunk is allocated on one of the storage devices that is not configured to store data associated with the respective stripe.

BRIEF DESCRIPTION OF THE DRAWINGS

The invention may best be understood by referring to the following description and accompanying drawings that are used to illustrated embodiments of the invention. In the drawings.

DETAILED DESCRIPTION

Implementations of the present invention are described herein for purposes of illustration, namely a data layout mechanism and method for allocating integrity metadata within a storage system employing data striping are described. In accordance with one embodiment of the present invention, the data layout mechanism includes a number of storage devices, each of the storage devices having storage spaces allocated to store individual data stripe units associated with a number of stripes. Also included in the data layout mechanism are a number of metadata chunks, which are allocated within the storage devices such that (1) integrity metadata associated with at least two data stripe units of the same stripe is stored within a single metadata chunk, and (2) the metadata chunks are evenly distributed across the storage devices.

In one embodiment, the data layout mechanism is implemented within a disk array. However, the application of the data layout mechanism is not limited to a disk array; it can also be used in other types of storage systems, such as host based volume managers, etc. Additionally, it should be noted that the term "integrity metadata" (IMD) in the context of the present invention is used to describe a checksum, address data, or any other integrity metadata as known in the art, or combination thereof. The term "chunk" in the context of the present invention is used to describe a unit of data. In one embodiment, a chunk is a unit of data containing a defined number of bytes or blocks.

In the following description, specific details are set forth. However, it is understood that embodiments of the invention may be practiced without these specific details. In other instances, well-known circuits, structures and techniques have not been shown in detail in order to avoid obscuring the understanding of this description.

Figure 1A:
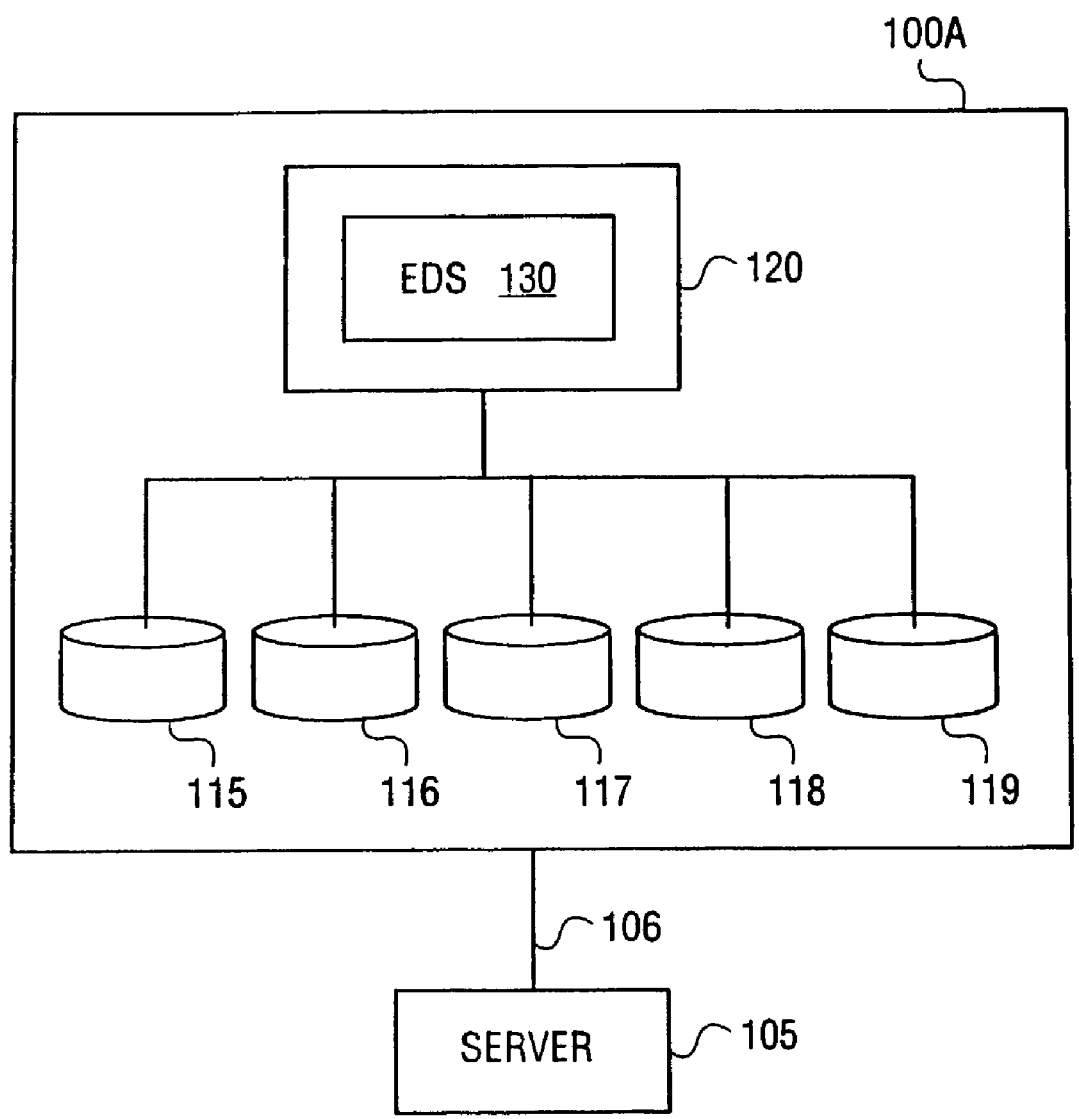
FIGS. 1A and 1B are block diagrams of data storage systems in accordance with alternative embodiments of the present invention.
Figure 1B:
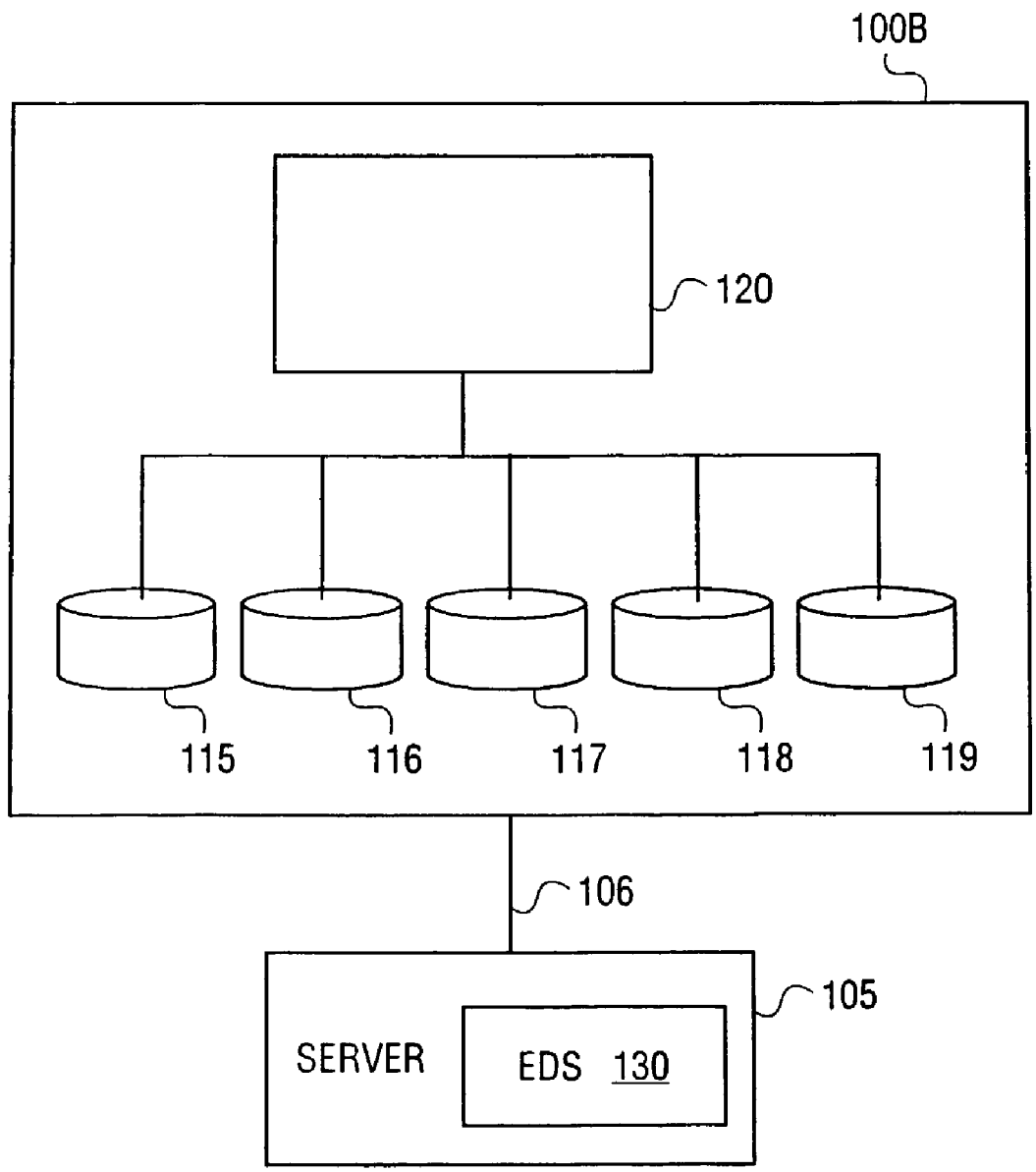

FIGS. 1A and 1B illustrate exemplary data storage systems in accordance with alternative embodiments of the present invention. The method of the present invention may be implemented on the data storage system shown in FIG. 1A. The data storage system 100A, shown in FIG. 1A contains one or more sets of storage devices, for example, disk drives 115–119 that may be magnetic or optical storage media. Data storage system 100A also contains one or more internal processors, shown collectively as the CPU 120. The CPU 120 may include a control unit, arithmetic unit and several registers with which to process information. CPU 120 provides the capability for data storage system 100A to perform tasks and execute software programs stored within the data storage system.

The method of data striping to accommodate integrity metadata in accordance with the present invention may be implemented by hardware and/or software contained within the storage system. In one embodiment, the CPU 120 of the storage device 100A may be configured to execute the program code to implement extended data striping (EDS) 130 for accommodating integrity metadata. In this embodiment, the CPU 120 may contain a memory that may be random access memory (RAM) or some other machine-readable medium, for storing program code (EDS 130) that may be executed by CPU 120.

The operations performed by the present invention may be embodied in the form of software program stored on a machine-readable medium. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices, or any type of media suitable for storing electronic instructions representing the software program. The code or instructions may be represented by carrier-wave signals, infrared signals, digital signals, and by other like signals.

For one embodiment, the data storage system 100A, shown in FIG. 1A, may include a server 105. Users of the data storage system may be connected to the server 105 via a network (not shown). The data storage system 100A communicates with the server 105 via a bus 106 that may be a standard bus for communicating information and signals and may implement a block-based protocol (e.g., SCSI). The CPU 120 is capable of responding to commands from server 105. Such an embodiment, in the alternative, may have the EDS 130 implemented in the server as illustrated by FIG. 1B. As shown in FIG. 1B, data storage system 100B has integrity metadata software 126 implemented in server 105.

It should be noted that the embodiments shown in FIGS. 1A and 1B are exemplary only, and extended data striping (EDS) techniques of the present invention can be implemented anywhere within the block based portion of the I/O datapath. By "datapath" we mean all software, hardware, or other entities that manipulate the data from the time that it enters block form on writes to the point where it leaves block form on reads. The datapath extends from the computer that reads or writes the data (converting it into block form) to the storage device where the data resides during storage. EDS can be implemented anywhere within the datapath where data striping is possible (i.e., the data can be distributed into multiple storage devices). Also, any preexisting hardware and software datapath modules that perform striping (such as volume managers) can be exteded to use EDS.

Figure 2:
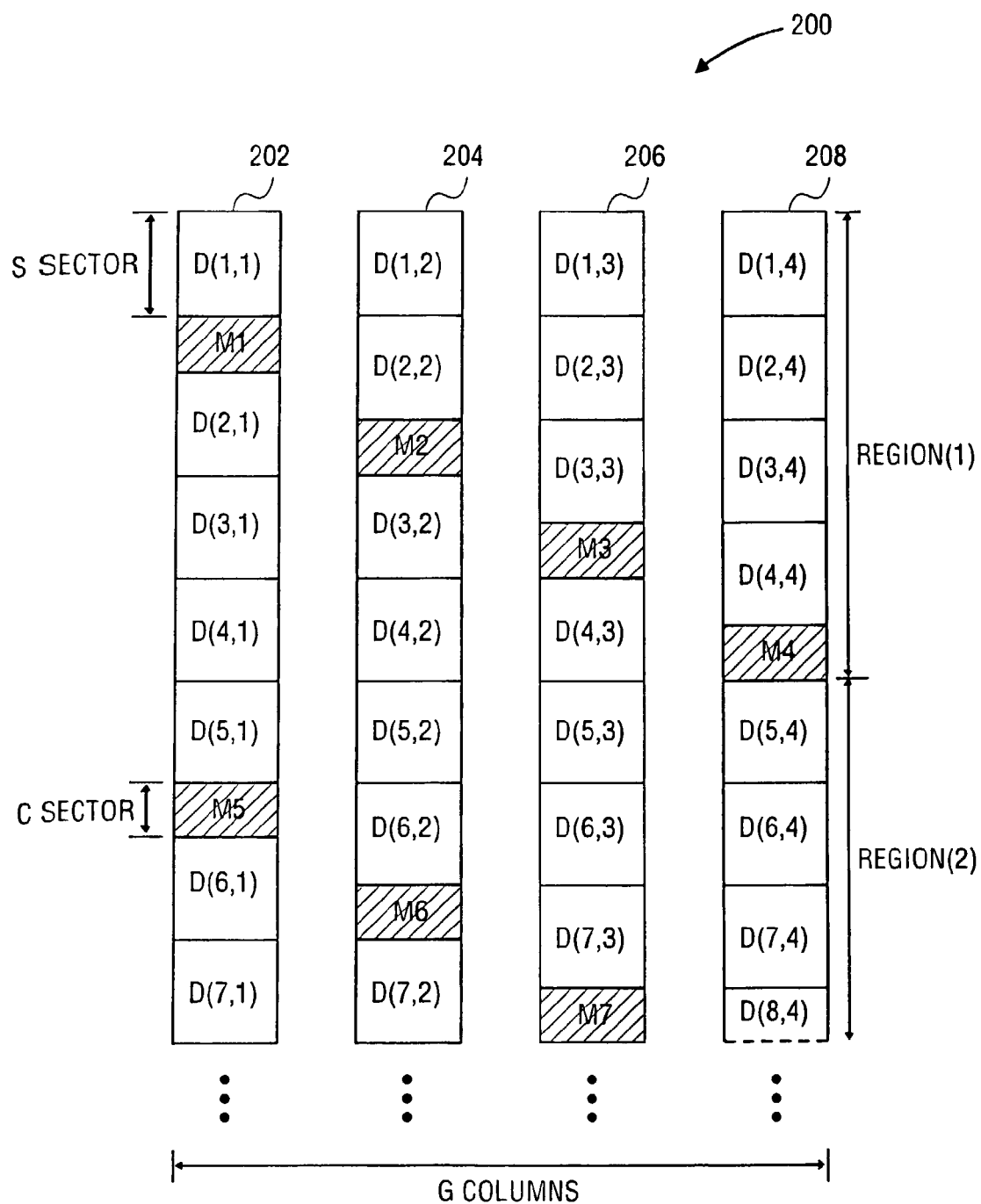
FIG. 2 shows a data layout mechanism of a storage system implementing data striping to accommodate integrity metadata in accordance with one embodiment of the present invention.

FIG. 2 shows a data layout mechanism of a storage system implementing extended data striping to accommodate integrity metadata (IMD) in accordance with one embodiment of the present invention. Data layout mechanism may include an array of G storage devices (e.g., disk drives) to accommodate stripes of data stripe units. Storage spaces may be allocated within each disk drive to store data stripe units and metadata chunks.

Data stripe units from each disk having the same unit address ranges are referred to as a stripe. In one embodiment, an array of G disk drives is used to service individual stripes having G data stripe units. For example, data may be striped over four disk drives 202 through 208 (each column of blocks is a disk drive) to service individual stripes containing four data stripe units.

Storage spaces are allocated with the array of storage devices to accommodate metadata chunks for individual stripes, namely M1 through M7, to store integrity metadata information associated with the respective stripe. In the illustrated embodiment, metadata associated with an entire stripe of data stripe units in stored within a single metadata chunk. Accordingly, metadata chunk M1 contains the metadata for all data stripe units (1, 1) through (1, 4) associated with the first stripe. Similarly, metadata for the second stripe (2, 1) through (2, 4) is contained in metadata chunk M2, etc. It should be noted that by storing metadata for the entire stripe within a single metadata chunk, read and write operations involving large data segments up to a full stripe (sequential I/O) will require only one access/update of a single metadata chunk.

In one embodiment, the metadata chunks M1 through M7 are evenly distributed across the disk drives 202 through 208. By doing so, each disk drive in the storage system participates in servicing IMD read and write requests. By evenly distributing the metadata chunks across the disk drives, each disk drive will store equal amounts of metadata. As a result, the layout is regular and the size of each metadata chunk is not dependent on the data stripe unit size. In other words, the size of individual metadata chunks does not have to equal the size of the data stripe units and will usually be smaller than the size of the data stripe units. The capacity overhead consumed by the metadata arrangement may depend only on the choice of integrity metadata used.

In the illustrated embodiment, each individual metadata chunk is allocated adjacent to one of the data stripe units associated with the corresponding stripe. This arrangement allows read operation of the metadata chunk to be combined with the read of the corresponding data stripe unit (i.e., stripe unit), thereby reducing the number of I/O operations necessary to service the data stripe unit and the metadata chunk. For example, in FIG. 2, the read operation of M1 can be combined with the read of the data stripe unit D(1, 1). Write operations may require a Read/Modify/Write of the metadata chunk. The write operation of the metadata chunk can also be combined with the write operation of the corresponding data stripe unit.

The embodiment shown in FIG. 2 provides split metadata protection for all but one of the stripe units. The term "split metadata protection" is used to describe a situation where the integrity metadata is stored on a separate disk drive from the corresponding data stripe unit. For example, three data stripe units D(1, 2), D(1, 3) and D(1,4) of the first stripe have their integrity metadata (Ml) stored on a different disk 202. There is additional degree of protection provided by having metadata stored on a different disk from the data. For example, the split metadata protection can be useful in detecting corruptions, misdirected I/Os, and stale data. The split metadata protection may be particularly useful for detection of stale data. For example, if stale data and corresponding metadata are stored on the same disk drive and that disk drive fails to write both the new data and corresponding metadata as requested by the storage system, the stale data may not be detected next time the storage system tries to read the new data from that disk drive because the stale data and corresponding metadata may still match. However, if the metadata associated with the stale data was stored on a different disk drive, such stale data would have been detected using the metadata information stored on a separate disk.

Accordingly, the embodiment shown in FIG. 2 does not provide stale data protection for the stripe unit that is co-located with the metadata chunk because if the disk fails to write both of these items, the resulting disk contents would be stale data that matches the stale metadata.

Figure 3:
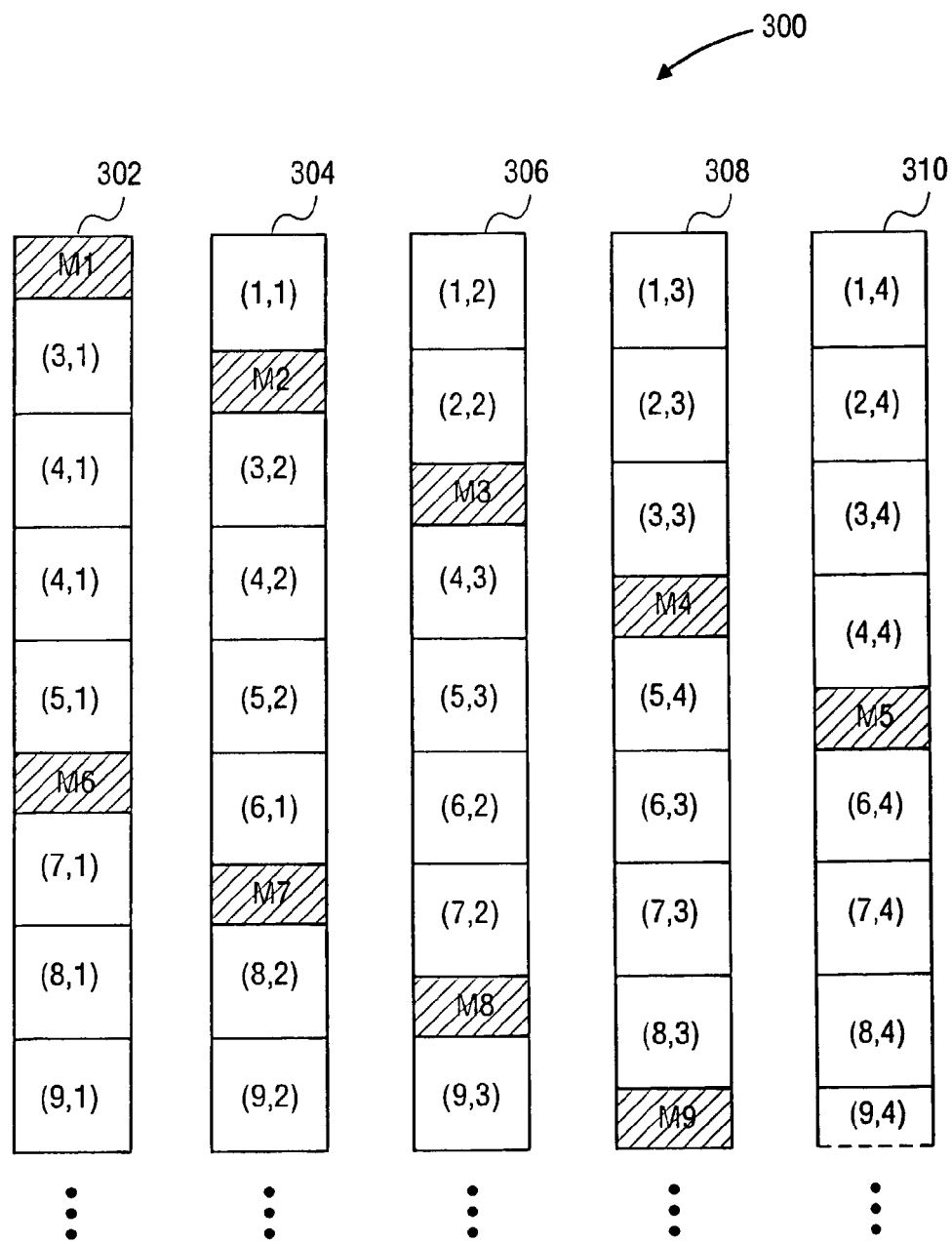
FIG. 3 shows a data layout mechanism of a storage system implementing data striping to accommodate integrity metadata in accordance with another embodiment of the present invention.

FIG. 3 shows a data layout mechanism of a storage system implementing extended data striping to accommodate integrity metadata in accordance with another embodiment of the present invention. The embodiment shown in FIG. 3 provides split metadata protection for all of the stripe units. In this embodiment, an array of G+1 disk drives 302 through 310 form the array to accommodate stripe rows having G number of data stripe units.

In this embodiment, the metadata chunks are distributed evenly across the disks. Additionally, metadata chunk associated with each individual stripe of data stripe unit is allocated on one of the disk drives that is not configured to store the data associated with the respective stripe. For example, the metadata (M1) for the first stripe of data stripe units (i.e., (1,1) through (1,4)) may be written to the first disk 302; the metadata (M2) for the second stripe of data stripe units (i.e., (2,1) through (2,4)) may be written to the second disk 304; the metadata (M3) for the third stripe of data stripe units (i.e., (3,1) through (3,4)) may be written to the third disk 306; and so on. In the illustrated embodiment, the location of the integrity metadata chunk in the array for succeeding stripe shifts to the next disk drive in the array, although other patterns may be used.

The embodiments shown in FIGS. 2 and 3 provide good storage of metadata but are designed to store only one copy of the metadata. While this should be sufficient for many applications, other applications that require a greater level of data integrity protection may require two copies of the metadata chunk. This is done with embodiments shown in FIGS. 4 and 5.

Figure 4:
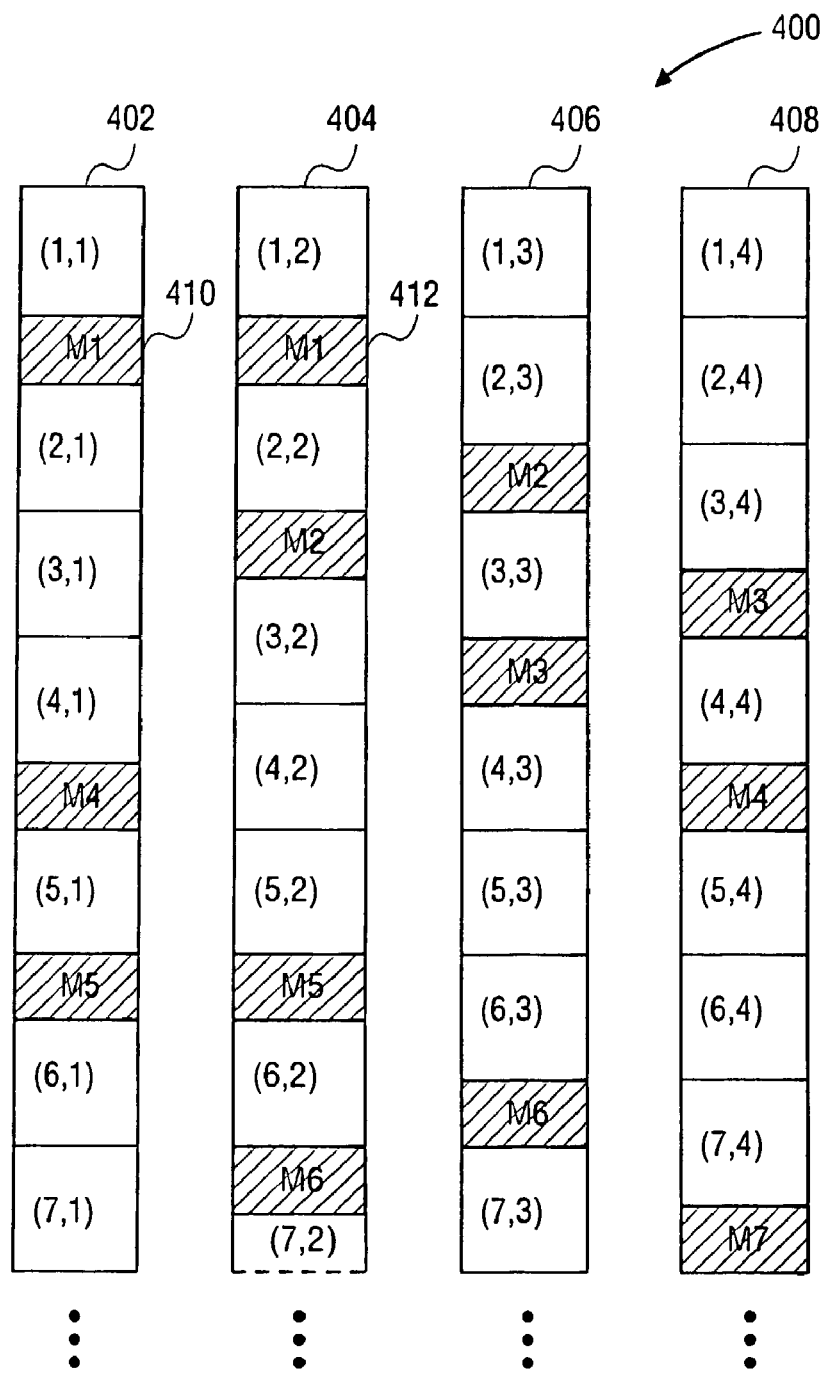
FIG. 4 shows a data layout mechanism of a storage system implementing data striping to accommodate multiple copies of integrity metadata in accordance with one embodiment of the present invention.

FIG. 4 is an extension of the embodiment shown in FIG. 2, which accommodates multiple copies of integrity metadata in accordance with one embodiment of the present invention. In this embodiment, multiple copies of the IMD chunks are maintained by the storage system without increasing the number of disk drives. For example, IMD chunk M1 (412) is an identical copy of the IMD chunk M1 (410). This is achieved by copying the IMD chunk M1 (410) and storing the copy in the second disk drive 404 in the location 412.

Figure 5:
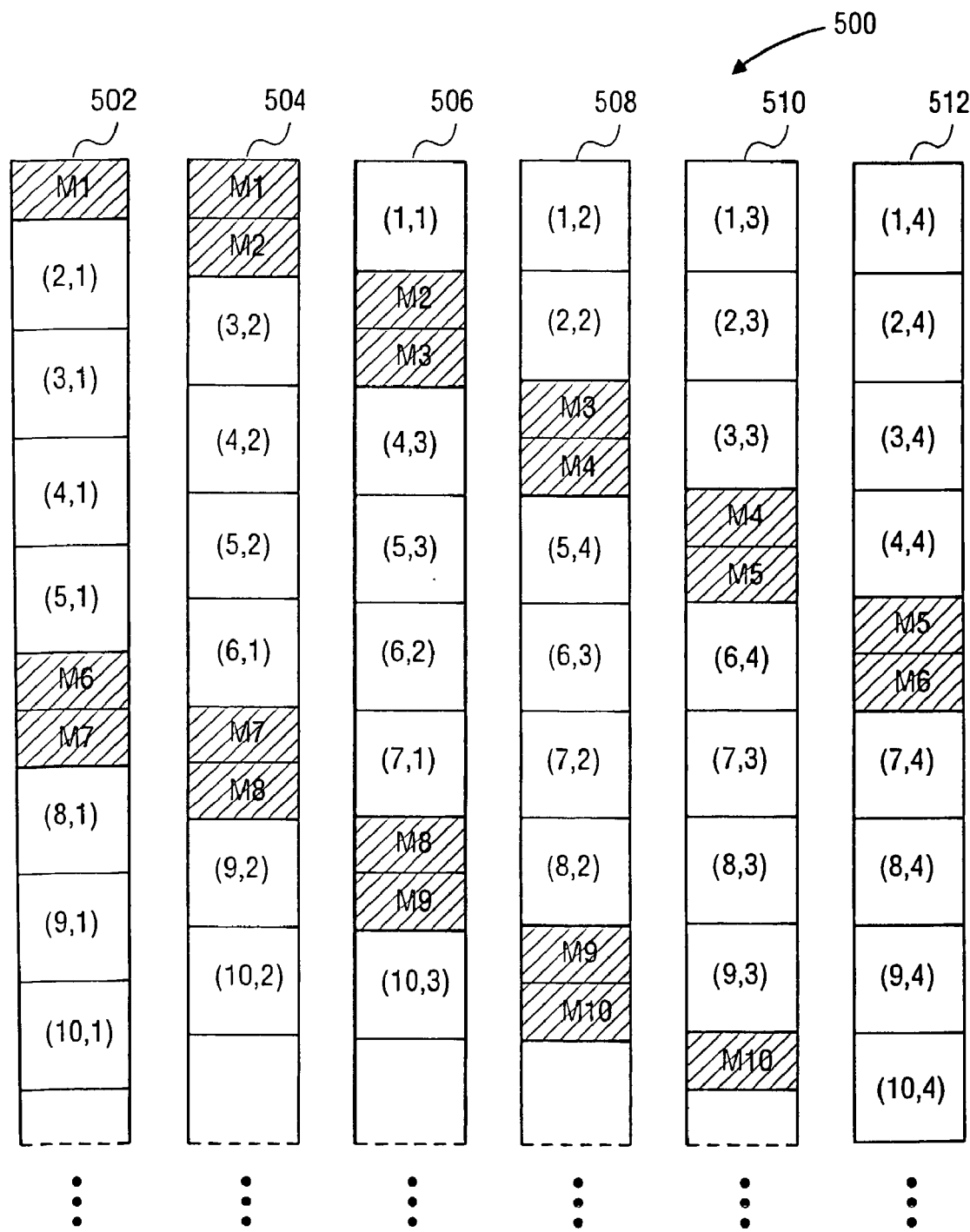
FIG. 5 shows a data layout mechanism of a storage system implementing data striping to accommodate multiples copies of the integrity metadata in accordance with another embodiment of the present invention.

FIG. 5 is an extension of the embodiment shown in FIG. 3, which accommodates multiple copies of integrity metadata in accordance with another embodiment of the present invention. In the array shown in FIG. 5, data stripe units and IMD chunks are arranged in an array of G+2 disk drives to store individual stripes having G number of data stripe units. Although FIGS. 4 and 5 show an array having two copies of the IMD, it should be noted that techniques taught by the present invention may be extended to store as many metadata copies as there are disk drives. The techniques shown in FIGS. 4 and 5 can also be combined. For example, it is possible to create a layout where one metadata copy is colocated with a data stripe unit and a second metadata copy is stored on a separate disk.

Figure 6A:
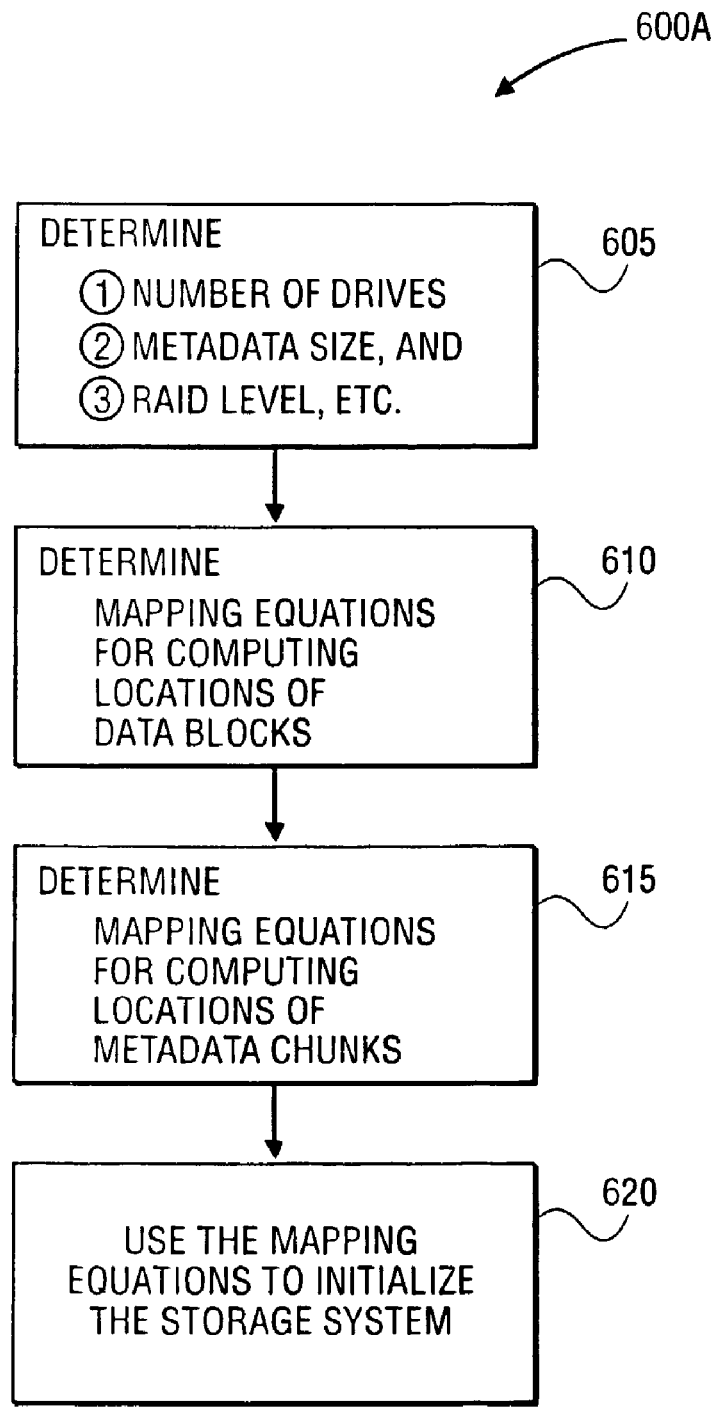
FIG. 6A is a flowchart diagram of an initialization operation in accordance with one embodiment of the present invention.
Figure 6B:
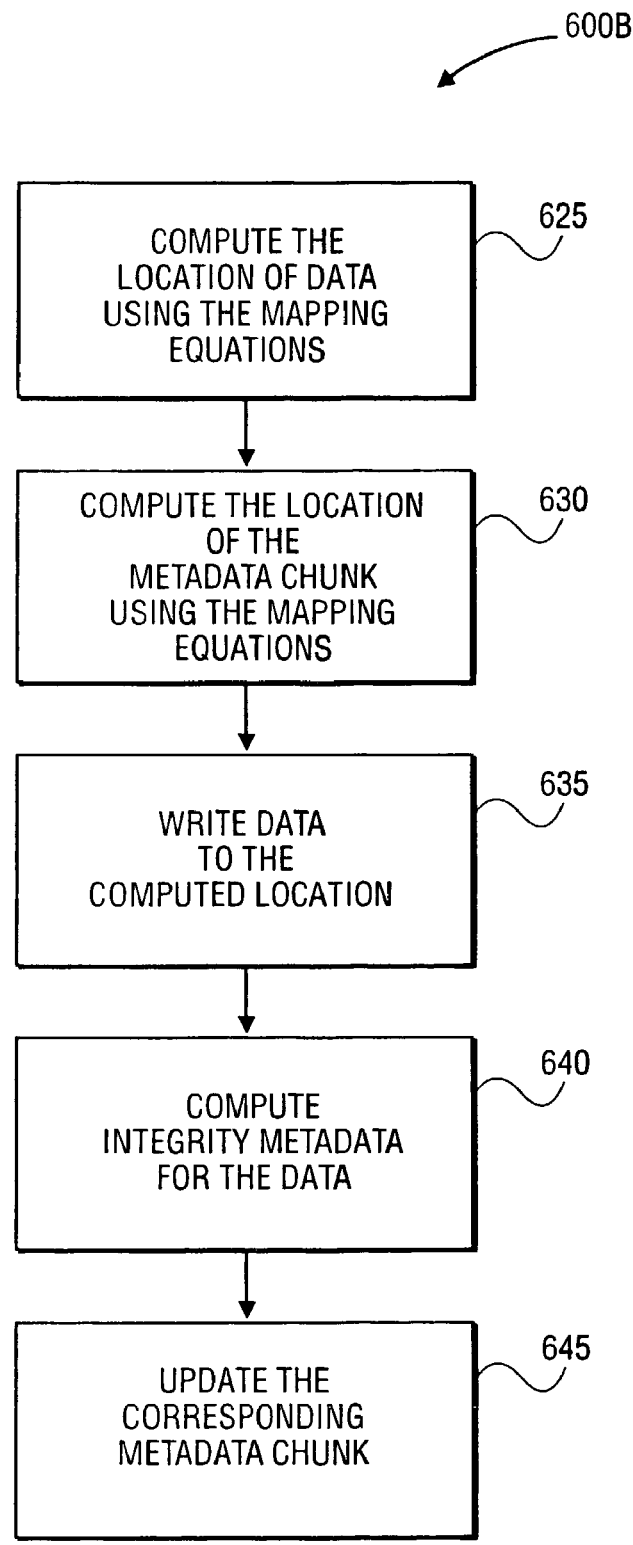
FIG. 6B is a flowchart diagram of a write operation in accordance with one embodiment of the present invention.
Figure 6C:
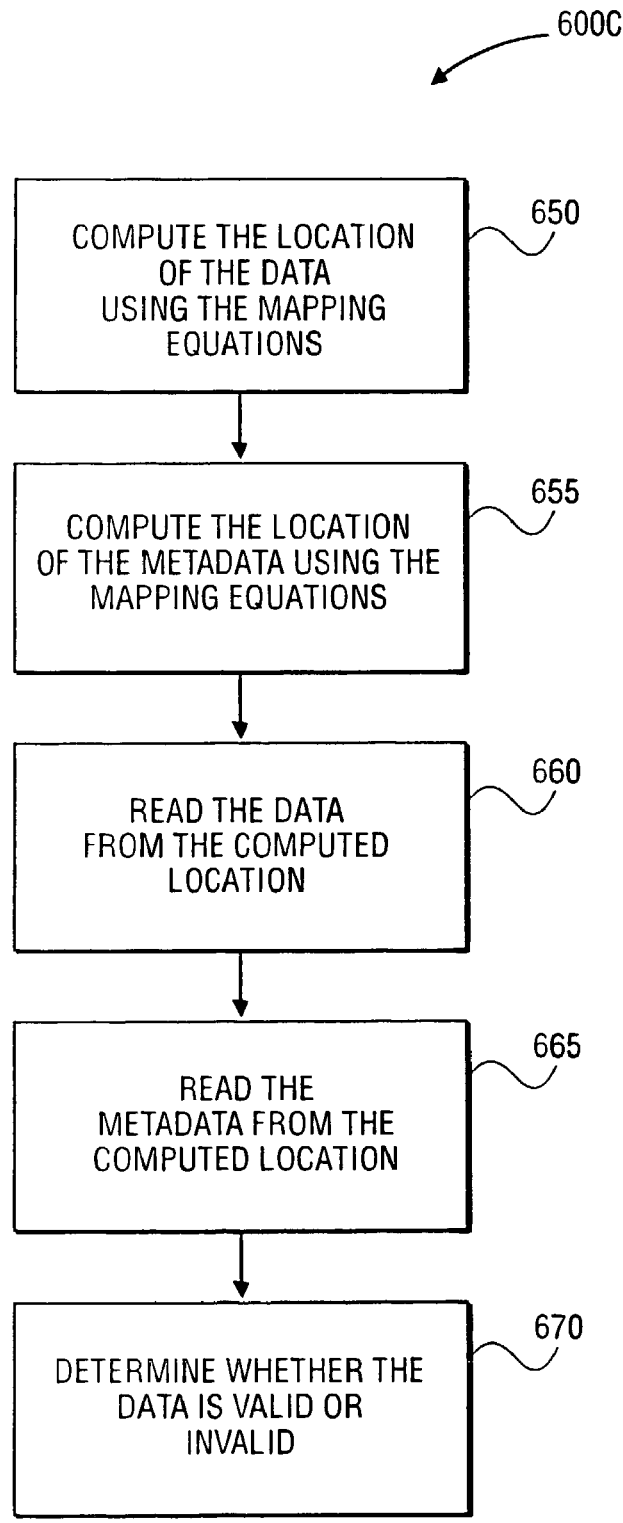
FIG. 6C is a flowchart diagram of a read operation in accordance with one embodiment of the present invention.

FIGS. 6A through 6C illustrate operations of allocating IMD chunks within an array of disk employing data striping according to one embodiment of the present invention.

Referring now to FIG. 6A, initialization process 600A begins at operation 605 where various parameters are determined such as (1) the number of disks in the storage system, (2) the size of each metadata chunk, and (3) the RAID configuration level. Information regarding other parameters may also be determined such as the size of each data stripe unit and the number of data stripe units contained in each stripe.

As noted above, in one embodiment, metadata associated with an entire stripe of data stripe units is stored within a single metadata chunk. Accordingly, the size of an metadata chunk is selected to provide sufficient storage space required to store integrity metadata for the entire stripe row. The amount of storage space required to store IMD may depend on the size of data stripe units comprising the stripe and the size of the integrity metadata for each data stripe unit. For example, for an array of 5 disks, segmented into 16 Kbyte data stripe units with 16 bytes of integrity metadata per 512 byte (½ Kbyte) sector, the amount of integrity metadata per stripe would be 2560 bytes (i.e., 5×16×16/0.5).

At operation 610, the mapping equations for computing locations of data stripe units are determined based on (1) the number of disks in the storage system, (2) the size of each metadata chunk, (3) the size of each data stripe unit, (4) the number of data stripe units in each stripe, and (5) the RAID configuration level. Similarly at operation 615, the mapping equations for computing locations of metadata chunks are determined based on various parameters obtained above. In accordance with one aspect of the present invention, the mapping equations are set up such that metadata associated with data stripe units of the same stripe row are stored within a single integrity metadata chunk, and metadata chunks are evenly distributed across the disk drives. Then, at operation 620, the mapping equations are used to initialize the storage system either statically or dynamically.

In one embodiment, the mapping equations are adapted to translate logical or virtual block addresses of the data (LBAs) to physical block address of the data (PBA) and physical block address of the start of the metadata chunk for the stripe containing the current block (CBA).

Referring to FIG. 2, each stripe contains G stripe units. Each stripe unit contains S sectors. The metadata chunk for a single stripe contains C sectors. The following is an example showing one method of developing mapping for the rotated metadata configuration shown in FIG. 2. First, the logical/virtual block address (LBA) of a request is used to locate the region where the corresponding data begins. Next, the index of the data stripe unit that contains the starting bytes of this request is determined. Stripe units are labeled D(1, 1) through D(x, y) as shown in FIG. 2. The data stripe unit index is the position of this stripe unit in the linear sequence of data stripe units. In one embodiment, the data stripe unit index is used to determine values (i and j). In one embodiment, values (i and j) are relative to the start of each respective region. For example, the first stripe unit D(5, 1) of the second region (REGION(2)) corresponds with values (i=1 and j=1). Similarly, the stripe unit D(7,4) of the second region (REGION(2)) corresponds with values (i=3 and j=4). Once i and j are calculated, the values (i and j) are used to determine which disk holds D(i,j) and the physical block address of the data (PBA) on that disk.

As shown in FIG. 2, each region contains G*G data stripe units. Each of the stripe units contains S sectors. Therefore, each region contains S*G*G data sectors. Accordingly, for any sector address LBA, the region that contains the sector is computed as follows:

$$\text{Index of Region containing } LBA = \left\lfloor \frac{LBA}{S \times G \times G} \right\rfloor \quad (1)$$

The data stripe unit index is computed as follows:

$$\text{Data Stripe Unit Index} = \left\lfloor \frac{LBA}{S} \right\rfloor \% (G \times G) \quad (2)$$

Using the data stripe unit index, i and j are computed as follows:

$$i = \left\lfloor \frac{DataStripeUnitIndex}{G} \right\rfloor \quad (3)$$

$$j = \text{Data Stripe Unit Index} \% G \quad (4)$$

If j<i, then D(i, j) is located on disk j, at an offset of i*S+C from the start of the current region. If j>=i, D(i, j) is then located on disk j, at an offset of i*S.

Once the location of the data inside the current region is found, the PBA can be determined by adding together the following: the starting offset of the current region, the offset of the current data stripe unit from the start of the region, and finally, the offset of the LBA from the start of the stripe unit. When j<i, the PBA is computed as follows:

$$PBA = (\text{Region Index} \times (G \times S + C)) + (i \times S = C) + LBA \% S \quad (5)$$

If j>=i, the PBA is computed as follows:

$$PBA = (\text{Region Index} \times (G \times S + C)) + i \times S + LBA \% S \quad (6)$$

The metadata chunk for D(i,j) is located on disk i at offset (i+1)*S from the start of the current region. The CBA, the address of the start of the metadata chunk is computed as follows:

$$CBA = (\text{Region Index} \times (G \times S + C)) + (i+1) \times S \quad (7)$$

A person skilled in the art will recognize that the technique described above for determining mapping equations for the rotated metadata configuration, shown in FIG. 2, may be applied to derive mapping equations for other rotated metadata configurations, including rotated metadata configurations shown in FIGS. 3 through 5 and other RAID configurations. Additionally, it should be noted that the mapping equations provided herein are exemplary only, and other mapping equations for locating data stripe units and IMD chunks are within the scope of this invention.

According to one aspect of one embodiment, the mapping is developed such that the IMD chunks are distributed evenly among the disk drives. In one implementation where the storage system comprises an array of G disk drives to service stripes having G data stripe units (such as the array architecture shown in FIG. 2), the IMD chunks are allocated adjacent to one of the data stripe units associated with the same stripe. In another implementation where the storage system comprises an array of G+1 disk drives to service stripes having G data stripe units (such as the array architecture shown in FIG. 3), the IMD chunk is allocated on one of the disk drives in the array that does not store data for the respective stripe row in accordance with one aspect of another embodiment.

Referring now to FIG. 6B, when a write request is received, the data to be stored is divided into data stripe units and distributed evenly across the disk drives. The location of where the data stripe unit(s) will be written is computed, at operation 625, using the mapping equations defined above. At the same time, the location of the corresponding integrity metadata chunk is computed, at operation 630, using the mapping equations defined above. Then at operation 635, the data stripe unit(s) is written to the disks based on the storage location information. Moreover, metadata is generated on writes and recorded in the proper metadata chunk location. This is accomplished by computing metadata for the data stripe unit(s) at operation 640. And, once the integrity metadata for data stripe unit(s) of a stripe has been generated, the corresponding metadata chunk is updated by performing a Read/Modify/Write (RMW) operation at operation 645. Read/Modify/Write operations are necessary for metadata updates because most integrity metadata is far smaller than a disk sector and typical storage systems perform I/O in units of disk sectors.

Referring now to FIG. 6C, read operation 600C begins at operation 650 in which the location of the data stripe unit requested by a read request is computed using the proper mapping equations. Similarly, at operation 655, the location of the corresponding integrity metadata is computed using the proper mapping equations. Then at operation 660, the data stripe unit is read from the computed location. At the same time, the previously stored integrity metadata corresponding to the data stripe unit is checked on a read operation to determine if the data is valid. This may be accomplished by reading the corresponding metadata from the computed location at operation 665. Then, based on the integrity metadata read, it is determined whether the data read from the storage system is valid or invalid at operation 670.

It should be noted that the methods and data layout mechanisms taught by the present invention for providing extended data striping to accommodate integrity metadata may be implemented in any type of storage systems utilizing data striping. Various types of RAID configurations have been defined and use data striping to improve performance. Therefore, the allocation of metadata chunks within an array of disks may be implemented in any storage system, which use data striping, including various types of RAID configurations utilizing data striping.

While the invention has been described in terms of several embodiments, those skilled in the art will recognize that the invention is not limited to the embodiments described, but can be practiced with modification and alternation within the spirit and scope of the appended claims. The description is thus to be regarded as illustrative instead of limiting.

What is claimed is:

1. A data layout mechanism comprising:
   a plurality of storage devices, each of said storage devices having storage spaces allocated to store individual data stripe units in a plurality of stripes;
   a plurality of metadata chunks, each metadata chunk including integrity metadata for each individual data stripe unit of a respective one of the plurality of stripes, and wherein said metadata chunks are allocated within the storage devices such that (1) said integrity metadata associated with at least two individual data stripe units of a common data stripe is stored within a single metadata chunk, and (2) said plurality of metadata chunks are distributed across the storage devices.

2. The data layout mechanism of claim 1, wherein the integrity metadata for each individual data stripe units of an entire stripe is stored within a single metadata chunk.

3. The data layout mechanism of claim 1, wherein the integrity metadata is selected from the group consisting of checksum data, address data or combination thereof.

4. The data layout mechanism of claim 1, wherein storage space for each respective metadata chunk is allocated adjacent to one of the data stripe units associated with the corresponding stripe.

5. The data layout mechanism of claim 1, wherein storage space for each respective metadata chunk is allocated within one of the storage devices that is not configured to store data associated with the respective stripe.

6. The data layout mechanism of claim 1, further comprising a controller to receive data to be stored on the storage devices and to divide the data into individual data stripe units and distribute the individual data stripe units across the storage devices.

7. The data layout mechanism of claim 6, wherein said controller is configured to generate the integrity metadata for each data stripe unit in the respective stripe and to store the integrity metadata for each individual data stripe unit of an entire stripe within a single metadata chunk.

8. The data layout mechanism of claim 6, wherein said controller is configured to copy the integrity metadata for each individual data stripe unit of an entire stripe, and to store the copy of the integrity metadata on one of said plurality of storage devices.

9. A method comprising:
   allocating storage spaces within a plurality of storage devices to store individual data stripe units in a plurality of stripes;
   generating integrity metadata for each individual data stripe unit in each individual data stripe unit of a respective one of the plurality of stripes; and
   allocating storage spaces within said storage devices to store the integrity metadata such that (1) said integrity metadata associated with at least two individual data stripe units of a common data stripe is stored within a single metadata chunk, and (2) said metadata chunks associated with said plurality of stripes are distributed across the storage devices.

10. The method of claim 9, wherein the integrity metadata for each individual data stripe unit of an entire stripe is stored within a single metadata chunk.

11. The method of claim 9, further comprising:
    receiving data to be stored on the storage devices;
    dividing the data into individual data stripe units and storing the individual data stripe units by distributing the individual data stripe units across the storage devices; and
    storing the integrity metadata for each individual data stripe unit in the respective stripe in one of the storage devices adjacent to the data associated with the respective stripe, wherein the stored integrity metadata associated with different stripes is distributed across the storage devices.

12. The method of claim 11, further comprising:
    copying the integrity metadata for each individual data stripe unit in the respective stripe; and
    storing the copy of the integrity metadata on another one of said storage devices adjacent to the data associated with the respective stripe.

13. The method of claim 9, further comprising:
    receiving data to be stored on the storage devices;
    dividing the data into individual data stripe units and storing the individual data stripe units by distributing the individual data stripe units across the storage devices;
    storing the integrity metadata for each individual data stripe units in the respective stripe on one of the storage devices that is not configured to store the data associated with the respective stripe, wherein the stored integrity metadata associated with different stripes is distributed across the storage devices.

14. The method of claim 13, further comprising:
    copying the integrity metadata for each individual data stripe units in the respective stripe; and
    storing the copy of the integrity metadata on another one of said storage devices that is not configured to store data associated with the respective stripe.

15. The method of claim 9, wherein the integrity metadata is selected from the group consisting of checksum data, address data or combination thereof.

16. A machine-readable medium containing instructions, which when executed by a processor cause said processor to perform operations comprising:
    allocating storage spaces within a plurality of storage devices to store individual data stripe units in a plurality of stripes;
    generating an integrity metadata for each individual data stripe unit of a respective one of the plurality of stripes; and
    allocating storage spaces within said storage devices to store the integrity metadata for each individual data stripe units of the respective one of the plurality of stripes such that (1) said integrity metadata associated with at least two individual data stripe units of a common data stripe is stored within a single metadata chunk, and (2) said metadata chunks associated with said plurality of stripes are distributed across the storage devices.

17. The machine-readable medium of claim 16, wherein the integrity metadata for each individual data stripe units in the entire stripe is stored within a single metadata chunk.

18. The machine-readable medium of claim 16, wherein the operations further comprise:
    receiving data to be stored on the storage devices;
    dividing the data into individual data stripe units and storing the individual data stripe units by distributing the individual data stripe units across the storage devices; and
    storing the integrity metadata for each individual data stripe units in the respective stripe in one of the storage devices adjacent to the data associated with the respective stripe, wherein the stored integrity metadata associated with different stripes is distributed across the storage devices.

19. The machine-readable medium of claim 18, wherein the operations further comprise:
  copying the integrity metadata for each individual data stripe units in the respective stripe; and
  storing the copy of the integrity metadata on another one of said storage devices adjacent to the data associated with the respective stripe.

20. The machine-readable medium of claim 16, wherein the operations further comprise:
  receiving data to be stored on the storage devices;
  dividing the data into individual data stripe units and storing the individual data stripe units by distributing the individual data stripe units across the storage devices;
  combining the integrity metadata for each individual data stripe units in the respective stripe; and
  storing the combined integrity metadata on one of the storage devices that is not configured to store the data associated with the respective stripe, wherein the stored combined integrity metadata associated with different stripes is distributed across the storage devices.

21. The machine-readable medium of claim 20, wherein the operations further comprise:
  copying the integrity metadata for each individual data stripe units in the respective stripe; and
  storing the copy of the integrity metadata on another one of said storage devices that is not configured to store data associated with the respective stripe.

22. The machine-readable medium of claim 16, wherein the integrity metadata is selected from the group consisting of checksum data, address data or combination thereof.

23. An apparatus comprising:
  means for allocating storage spaces within a plurality of storage devices to store individual data stripe units in a plurality of stripes;
  means for allocating storage space within said storage devices to store an integrity metadata for each individual data stripe unit of a respective one of the plurality of stripes such that (1) integrity metadata associated with at least two data stripe units of a common data stripe is stored within a single metadata chunk, and (2) metadata chunks associated with said plurality of stripes are distributed across the storage devices.

24. The apparatus of claim 23, wherein the integrity metadata for each of the individual data stripe units in an entire stripe is stored within a single metadata chunk.

25. The apparatus of claim 23, wherein the integrity metadata is selected from the group consisting of checksum data, address data or combination thereof.

26. The apparatus of claim 23, wherein the storage space for each respective metadata chunk is allocated adjacent to data associated with the corresponding stripe.

27. The apparatus of claim 23, further comprising:
  means for receiving data to be stored on the storage devices;
  means for dividing the data into individual data stripe units and storing the individual data stripe units by distributing the individual data stripe units across the storage devices; and
  means for storing the integrity metadata for each of the individual data stripe units in the respective stripe in one of the storage devices adjacent to the data associated with the respective stripe, wherein the stored metadata chunks associated with different stripes are distributed across the storage devices.

28. The apparatus of claim 27, further comprising:
  means for copying the integrity metadata for each of the individual data stripe units in the respective stripe; and
  means for storing the copy of the integrity metadata on another one of said storage devices adjacent to the data associated with the respective stripe.

29. The apparatus of claim 23, wherein the storage space for integrity metadata is allocated on one of the storage devices that is not configured to store data associated with the respective stripe.

30. The apparatus of claim 23, further comprising:
  means for receiving data to be stored on the storage devices;
  means for dividing the data into individual data stripe units and storing the individual data stripe units by distributing the individual data stripe units across the storage devices;
  means for generating the integrity metadata for each individual data stripe unit in the respective stripe; and
  means for storing the integrity metadata for each individual data stripe unit in the respective stripe on one of the storage devices that is not configured to store the data associated with the respective stripe, wherein the stored integrity metadata associated with different stripes are evenly distributed across the storage devices.

31. The apparatus of claim 30, further comprising:
  means for copying the combined integrity metadata associated with the respective stripe; and
  means for storing the copy of the combined integrity metadata on another one of said storage devices that is not configured to store data associated with the respective stripe.

* * * * *